United States Patent [19]
Lavon

[11] 3,934,601
[45] Jan. 27, 1976

[54] METHOD OF AND ARRANGEMENT FOR FEEDING PRESSURE FLUID IN PULSES

[75] Inventor: Erik Volmar Lavon, Saltsjo-Boo, Sweden

[73] Assignee: Atlas Copco Aktiebolag, Nacka, Sweden

[22] Filed: July 15, 1974

[21] Appl. No.: 488,504

[30] Foreign Application Priority Data
Aug. 1, 1973 Sweden.............................. 7310580

[52] U.S. Cl. ...................... 137/14; 251/76; 417/241
[51] Int. Cl.² ......................................... F16K 31/44
[58] Field of Search .................. 251/76; 137/38, 14; 417/240, 241; 184/69

[56] References Cited
UNITED STATES PATENTS

| | | | |
|---|---|---|---|
| 1,502,984 | 7/1924 | Esnault-Pelterie.............. | 417/240 X |
| 2,634,756 | 4/1953 | Anderson............................... | 251/76 |
| 2,702,559 | 2/1955 | Bodine................................ | 137/38 |
| 3,521,652 | 7/1970 | Reeks .................................. | 137/38 |
| 3,741,344 | 6/1973 | Kohl et al............................ | 184/69 |

Primary Examiner—Henry T. Klinksiek
Attorney, Agent, or Firm—Flynn & Frishauf

[57] ABSTRACT

A method of and arrangement for feeding pressure fluid in pulses through a valve according to which the valve body is caused to momentarily lift from its seat by means of impulse waves generated in the valve housing by impacts thereagainst.

8 Claims, 2 Drawing Figures

METHOD OF AND ARRANGEMENT FOR FEEDING PRESSURE FLUID IN PULSES

This invention relates to a method and device for feeding pressure fluid in pulses through a valve comprising a housing and a valve body resting against a seat in the housing. In known valves for pressure fluid, the valve body is directly connected to a valve control means. The smallest possible pressure fluid quantity passing through the valve is limited by forces of inertia appearing in the valve body and in the valve control means.

It is an object of the invention to provide a method and device for feeding pressure fluid in quantities which are smaller than those possible with hitherto known values. Another object of the invention is to provide a valve which also at high pressures requires small operating forces. A further object of the invention is to solve the sealing problems which arise where the control means, which actuate the valve body, traverse the valve housing.

SUMMARY OF THE INVENTION

According to one aspect of the invention there is provided an improved method of feeding pressure fluid through a valve having a housing, a valve body in said housing and a seat in said housing for supporting said valve body, wherein the improvement comprises generating impulse waves in said housing for momentarily lifting said valve body from said seat in a direction opposite to the direction of the fluid flow.

According to another aspect of the invention there is provided a valve arrangement comprising a housing, a valve body in said housing, a seat in said housing for supporting said valve body, an impacting device attached to said housing, and means for actuating said device to generate impulse waves in said housing by delivering impacts thereagainst for momentarily lifting said valve body from said seat in a direction opposite to the direction of the fluid flow.

The above and other purposes of the invention will become obvious from the following description and from the accompanying drawings in which one embodiment of the invention is illustrated by way of example. It should be understood that this embodiment is only illustrative of the invention and that various modifications thereof may be made within the scope of the claims following hereinafter.

Other fields where there is need for feeding pressure fluid in small, precisely stated quantities are at fuel injection in engines and at dispensing gases and liquids.

DETAILED DESCRIPTION OF ILLUSTRATED EMBODIMENT

Figure 1:
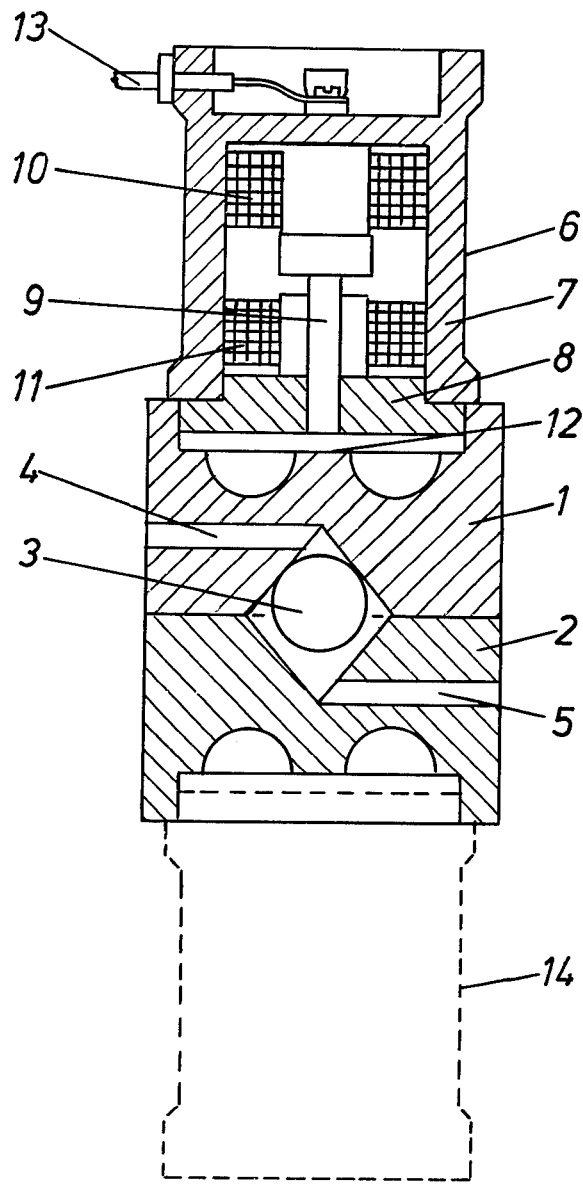
FIG. 1 shows a cross section of a valve with an impacting device belonging to it.

In FIG. 1, the housing of the valve is shown composed by two identical parts 1 and 2. In each part there is a seat for a valve body 3, shown in FIG. 1 as a ball. Channels 4 and 5 for pressure fluid are arranged in each part of the housing. An impacting device 6 is firmly attached to the part 1. The impacting device 6 comprises a housing 7 and a bottom plate 8. An armature 9 is arranged movably to and fro in the housing 7 by alternately exciting coils 10 and 11. The lower part of the armature 9 is moved through a recess in the plate 8 and delivers impacts against an upper surface 12 on the part 1 of the housing of the valve every time the armature moves downwards. A line for the exciting current for the coils 10 and 11 is indicated with 13.

The valve works in the following manner. The channel 5 is connected to a source of pressure fluid, whereby the valve body 3 is biased against the valve seat in the part 1 by the pressure fluid. If the armature 9 is caused to deliver an impact against the surface 12, an impulse wave is produced in the part 1, which impulse wave propagates itself to the valve body 3. The impulse wave causes the valve body 3 to be lifted momentarily from the seat, whereby a pressure fluid pulse passes out into the conduit 4. By varying the amplitude and/or frequency of the impacts a very precise determination of the fluid quantity passing through the valve can be made. A practically continuously variable regulation from small separate pulses to a continuous flow of fluid can be attained. In the last-mentioned case, impulse waves are produced with such a high frequency that the valve body is caused to vibrate. In FIG. 1 the valve is shown with two seats for the valve body. Due to suddenly arising pressure increases in the channel 4 the valve body 3 is brought to rest against the seat in the part 2 of the housing of the valve, whereby a check valve function is attained. As shown with dashed lines in FIG. 1 a second impacting device 14 can be arranged at the part 2. With the latter arrangement a further increase of the reaction velocity of the valve is attained by causing the impacting device 14 to deliver impacts immediately after the impacting device 6. The impacting device 14 can as well be used to operate the valve if the pressure ratio in the channels 4 and 5 is reversed.

Figure 2:
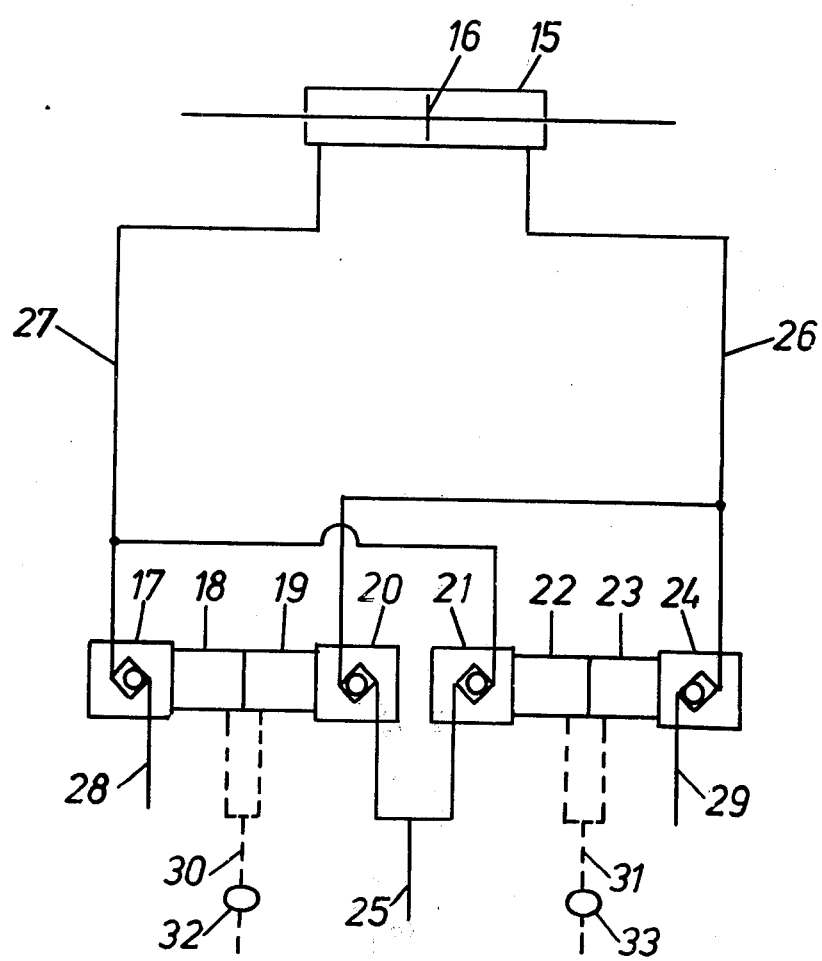
FIG. 2 shows an application of the invention, where the valve is used for controlling a piston movable to and fro in a cylinder, which piston for instance is intended for positioning a drill boom.

In FIG. 2, a control system is shown for a piston 16 movable to and fro in a cylinder 15. For controlling the movement of the piston four units of the above-mentioned type are used. In the following, the channel which is connected with the highest pressure, is taken as the inlet of the valve. Thus the outlet of the valve is normally closed. The inlets of the valves 20 and 21 are shown connected to a pressure source through the conduit 25. The outlet of the valve 20 and the inlet of the valve 24 are connected to the right cylinder chamber via the conduit 26 and the outlet of the valve 21 and the inlet of the valve 17 are connected to the left cylinder chamber via the conduit 27. The outlets of the valves 17 and 24 are connected to tank or debouch freely. The impacting devices 18 and 19 respectively of respectively the valves 17 and 20 are supplied with exciting current through the line 30 and the impacting devices 22 and 23 respectively of respectively the valves 21 and 24 are supplied with exciting current through the line 31. If a little movement of the piston 16 to the right is desired, the impacting devices 22 and 23 are caused to simultaneously deliver an impact impulse against the valves 21 and 24 respectively. This causes the valve body of the valve 21 to be momentarily lifted from its seat, whereby a pressure fluid pulse is conducted into the left chamber of the cylinder via the conduit 27. At the same time the valve body of the valve 24 lifts from its seat, whereby a pressure fluid pulse from the right cylinder chamber of the same amount as that supplied to the left cylinder chamber passes the valve 24 via the conduit 26. At an opposite movement of the piston 16, the impacting devices 18 and 19 respectively are actuated. Control means 32 and 33 are provided for regulating the amplitude and/or frequency of the impacts.

The embodiment of the valve is not restricted to that shown in FIG. 1 but can be modified within the scope of the claims following hereinafter. Thus the valve can be designed with only one valve seat, and/or a return spring for the valve body can be arranged. The valve seat is preferably designed conically for attaining a directed impact action. The valve body can be designed in different ways. The inlet and outlet channels can be arranged in different manners. They can for instance be directed in the direction of the impulse waves to avoid disturbing the latter. The impact impulses can, besides electrically, be attained manually, pneumatically or hydraulically. The impacts do not need to be directed in the moving directions of the valve body but any arbitrary direction can be chosen.

What I claim is:

1. In a method of discharging pressure fluid through a valve by using fluid pressure as driving power, said valve including a housing, a pressure fluid conduit means in said housing, a valve body in said housing, and a valve seat in said housing on communication with said fluid conduit means for normally sealingly cooperating with said valve body to normally block said fluid conduit means, the improvement comprising:
    generating shock waves in said housing by delivering impacts thereagainst for momemtarily lifting said valve body from said seat in a direction opposite to the direction of the fluid flow to momentarily unblock said fluid conduit means to discharge a pulse of pressure fluid.

2. A method according to claim 1, comprising delivering said impacts in the direction of motion of said valve body.

3. A method according to claim 1, comprising regulating the amplitude of said impacts.

4. A method according to claim 1 comprising regulating the frequency of said impacts.

5. A valve arrangement for discharging pressure fluid by using the fluid pressure as driving power comprising:
    a housing;
    a pressure fluid conduit means in said housing;
    a valve body in said housing;
    a valve seat in said housing in communication with said fluid conduit means for normally sealingly cooperating with said valve body to normally block said conduit means;
    an impacting device attached to said housing; and
    means for actuating said impacting device to impact said housing to generate shock waves in said housing for momentarily moving said valve body from said valve seat in a direction opposite to the direction of the fluid flow in said pressure fluid conduit means to momentarily unblock said conduit means to discharge a pulse of pressure fluid.

6. A valve arrangement according to claim 5, including means for biasing said valve body against said seat under the influence of said pressure fluid.

7. A valve arrangement according to claim 6, wherein said housing includes two seats for said valve body located at opposed sides thereof, said valve body being normally biased against one of said seats.

8. A valve arrangement according to claim 7, wherein said housing comprises a duality of identically alike parts.

* * * * *